(12) United States Patent
Teng et al.

(10) Patent No.: US 9,844,060 B2
(45) Date of Patent: Dec. 12, 2017

(54) SELF-TUNING BASE STATION FOR A WIRELESS NETWORK

(75) Inventors: Yong Teng, Beijing (CN); Yuanyong Yin, Shanghai (CN); Lingfeng Wang, Bristol (GB); Jiang Wang, Shanghai (CN); Jing Xu, Shanghai (CN); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 148 days.

(21) Appl. No.: 14/111,229

(22) PCT Filed: Apr. 15, 2011

(86) PCT No.: PCT/CN2011/072838
§ 371 (c)(1),
(2), (4) Date: Oct. 11, 2013

(87) PCT Pub. No.: WO2012/139299
PCT Pub. Date: Oct. 18, 2012

(65) Prior Publication Data
US 2014/0036714 A1    Feb. 6, 2014

(51) Int. Cl.
*H04W 72/10* (2009.01)
*H04W 72/08* (2009.01)
(Continued)

(52) U.S. Cl.
CPC ......... *H04W 72/082* (2013.01); *H04W 24/02* (2013.01); *H04W 52/28* (2013.01);
(Continued)

(58) Field of Classification Search
CPC ......... H04W 72/0453; H04W 72/005; H04W 52/28; H04W 72/10; H04W 84/18;
(Continued)

(56) References Cited

U.S. PATENT DOCUMENTS

| | | | | |
|---|---|---|---|---|
| 2002/0120941 A1* | 8/2002 | Rokuhara | .......... | H04N 7/17309 725/111 |
| 2009/0054047 A1* | 2/2009 | Kylvaja | .............. | H04L 41/0823 455/418 |

(Continued)

FOREIGN PATENT DOCUMENTS

| | | |
|---|---|---|
| CN | 101854633 A | 10/2010 |
| CN | 101964985 A | 2/2011 |
| JP | 2010268463 A | 11/2010 |

OTHER PUBLICATIONS

Feng et al; "Self-Organizing Networks (SON) in 3GPP Long Term Evolution"; Numor Research GmbH; Munich, Germany; May 20, 2008; pp. 1-15.*

(Continued)

*Primary Examiner* — Salvador E Rivas
(74) *Attorney, Agent, or Firm* — Harrington & Smith (57) ABSTRACT

It is provided an apparatus, including base station means to provide a base station functionality using component carriers; neighbor detecting means to detect a neighboring base station; informing means to inform a coordinating device about the neighboring base station; willingness setting means to set a willingness to perform self-tuning based on a respective long-term priority for each component carrier, wherein the long-term priorities are received from the coordinating device, and the willingness is only set if the long-term priorities are not in contradiction to an actual requirement, willingness providing means to provide an indication of the willingness to the coordinating device; and self-tuning means to perform self-tuning if an agreement statement is received from the coordinating device, wherein, as a result of the self-tuning, a usage of each component carrier by the base station means is based on the received long-term information and the actual requirement.

16 Claims, 5 Drawing Sheets

(51) Int. Cl.
| | |
|---|---|
| *H04W 52/28* | (2009.01) |
| *H04W 84/18* | (2009.01) |
| *H04W 24/02* | (2009.01) |
| *H04W 28/02* | (2009.01) |
| *H04W 16/10* | (2009.01) |
| *H04W 84/04* | (2009.01) |

(52) U.S. Cl.
CPC .......... *H04W 72/10* (2013.01); *H04W 84/18* (2013.01); *H04W 16/10* (2013.01); *H04W 28/021* (2013.01); *H04W 84/045* (2013.01)

(58) Field of Classification Search
CPC ............. H04W 28/021; H04L 27/2601; H04L 41/0813; H04J 11/0069
See application file for complete search history.

(56) References Cited

U.S. PATENT DOCUMENTS

| 2010/0216486 | A1* | 8/2010 | Kwon, II | ......... | H04W 72/0426 |
| | | | | | 455/452.2 |
| 2010/0284303 | A1* | 11/2010 | Catovic et al. | ............... | 370/254 |
| 2013/0208702 | A1* | 8/2013 | Sandberg | ............. | H04W 24/02 |
| | | | | | 370/331 |

OTHER PUBLICATIONS

3GPP, "TR 36.922 v.9.1.0", Jul. 2010, pp. 1-74.*
3GPP TR 36.922 V10.0.0 (Apr. 2011); 3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 10), (74 pages).
R4-100703; CMCC; "Text proposal on interference control among neighboring HeNBs"; 3GPP TSG-RAN WG4 #54; San Francisco, USA, Feb. 22-26, 2010, (3 pages).
3GPP TSG-RAN WG4 #AdHocl; "Text proposal on LTE TDD HeNB interference control"; Sophia Antipolis, FR; Jan. 18-22, 2010; R4-100178; 21 pgs.
3GPP TSG-RAN WG4 #52bis; "Utility Messages for HeNB ICIC"; Miyazaki, Japan; Oct. 12-16, 2009; R4-094851; 5 pgs.
3GPP TSG-RAN WG4 Meeting #52; "Downlink interference coordination between HeNBs"; Shenzhen, China; Aug. 24-28, 2009; R4-092872; 4 pgs.
3GPP TSG-RAN WG4 #51; "Frequency reuse results with mixed traffic", San Francisco, USA; May 4-8, 2009; R4-091907; 8 pgs.
3GPP TSG-RAN WG4 #51; "Frequency reuse results with full buffer"; San Francisco, USA; May 4-8, 2009; R4-091906; 4 pgs.
3GPP TR 36.922 V1.0.0 (Dec. 2009); "LTE TDD Home eNodeB RF Requirements (Release 9)"; 39 pgs.
3GPP TR 36.921 V1.0.0 (Dec. 2009); FDD Home eNodeB (HeNB) Radio Frequency (RF) requirements analysis (Release 9); 22 pgs.
3GPP TR 36.902 V9.0.0 (Sep. 2009); Self-configuring and self-optimizing network use cases and,solutions (Release 9); 23 pgs.
3GPP TR 32.823 V9.0.0 (Sep. 2009); "Self-Organizing Networks (SON); Study on selfhealing (Release 9)"; 14 pgs.
3GPP TS 32.541 V1.0.0 (Sep. 2009); Self-Healing OAM; Concepts and Requirements (Release 9); 20 pgs.
Feng et al.; "Self-Organizing Networks (SON) in 3GPP Long Term Evolution"; Numor Research GmbH; Munich, Germany; May 20, 2008; 15 pgs.

* cited by examiner

FIG 1

Prior Art

FIG 2

Prior Art

SELF-TUNING BASE STATION FOR A WIRELESS NETWORK

FIELD OF THE INVENTION

The present invention relates to an apparatus, a method, a system, and a computer program product related to self-tuning of NodeBs. More particularly, the present invention relates to an apparatus, a method, a system, and a computer program product for self-tuning of Home eNodeBs.

BACKGROUND OF THE INVENTION

The present application is in the field of mobile wireless communication systems, including $3^{rd}$ generation partnership project (3GPP) Long-Term Evolution Advanced (LTE-A). And in more detail, the problem raised and scheme proposed are particularly relevant for Home eNodeB (HeNB) interference control and self-configuration in dynamic HeNB network.

Self-Organizing Networks (SON) is a distributed way to deal with problems existing in a network, and it has been determined as work item in 3GPP RAN3 [1] and RAN5 [2][3]. Self-tuning is an important part in SON [1][4], and its purpose is to figure out the faults which could be solved automatically by triggering appropriate recovery actions. For example, the "fault" may be mainly focused in the field of spectrum usage.

Due to the scarcity of the spectrum, with the increasing number of HeNB/HNB, some problems, such as strong interference, low throughput, occur in some nodes (say ill HeNBs, otherwise, say healthy HeNBs) in the networks. Self-tuning covers these problems for interference mitigation and throughput improvement. In the process of self-tuning, these ill HeNBs collect information of others and negotiate with them (not excluding negotiating with a network coordinator and some healthy HeNBs).

It can be expected that self-tuning will be a good scheme for HeNB/HNB, and will be a valuable topic in the near future.

It is expected that HeNB will be deployed in large scale. In no doubt, the number and density of HeNB will increase greatly in the coming years, especially in urban areas. On the other hand, the presence of pico cell, relay, etc, will cause the limited spectrum resource becoming scarcer. It can be predicted that spectrum jamming among HeNBs and HeNBs with other network (including pica cell, relay network, etc.) will be a serious problem. The problem will be sure to restrict the deployment of HeNB significantly.

Self-organization and self-configuration are efficient ways to solve the problem. In the following, one example is given.

Figure 1:
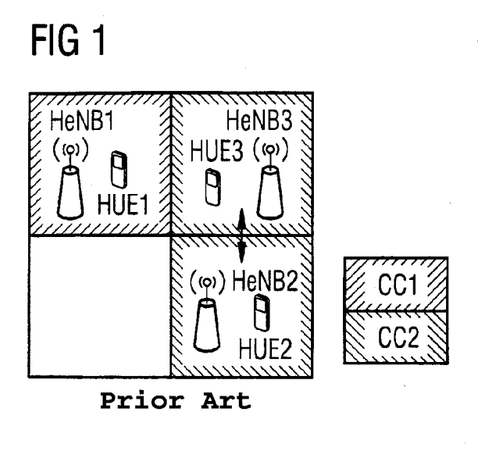
FIG. 1 shows a network with spectrum jamming.
Figure 2:
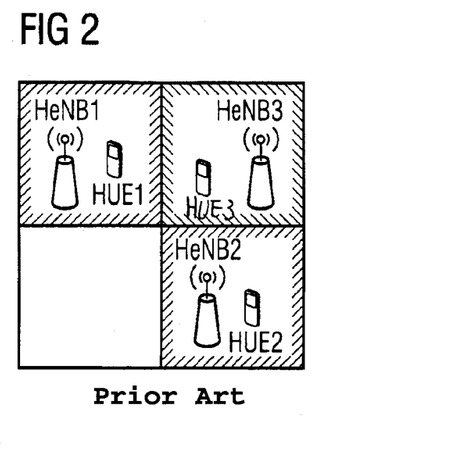
FIG. 2 shows the network of FIG. 1, where spectrum jamming is removed.
Figure 3:
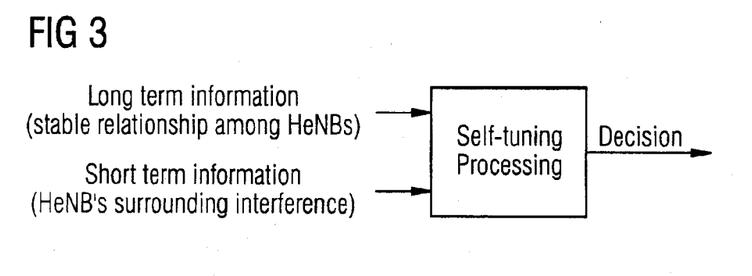
FIG. 3 shows a main decision path in self-tuning according to some embodiments of the invention.

According to FIG. 1, there are two component carriers (CCs) (CC1 and CC2) at all in the network. HeNB1 chooses CC1 as its active CC, both HeNB2 and HeNB3 use CC2. So there exists serious interference between HeNB2 and HeNB3 in FIG. 1. If one interference coordination mechanism (self-tuning) is available, then HeNB1, HeNB2 and HeNB3 (all, or some of them) could appropriately reselect their active CC, and then the spectrum jamming will be solved (FIG. 2). That is, HeNB1 and HeNB2, which are relatively well separated from each other, may select CC1 as active CC, and HeNB3 may select CC2, or vice versa.

In 3GPP, the topic of self organizing network (SON) has been discussed [1]-[3]. It provides efficient management for a small cell network, which includes numerous cells, such as femtocell (also called home NodeB/home eNodeB, HNB/HeNB). Self-tuning is an important part in the framework of SON [4], and self-tuning process and function have been defined in [2]. Self-tuning in the field of frequency resource optimization or interference management has not been widely discussed. For example, the corresponding use case according to section 4.9 of [1] is not completed.

On the other hand, interference mitigation has been a hot topic in 3GPP RAN4 (RAN: radio access network) work item, frequency division duplex/time division duplex (FDD/TDD) HeNB radio frequency (RF) requirements [5][6]. Sections 7.3.2.2.1 and 7.3.2.2.2 in the text proposal part in [7] conclude solutions for HeNB downlink interference mitigation among neighboring HeNBs. In section 7.3.2.2.1, solutions for centralized network architecture are given, and in section 7.3.2.2.2, solutions for a distributed architecture are provided. In the following, these two solutions are introduced shortly.

Centralized Architecture

In centralized network framework, one centralized controller is need. Each HeNB estimates the fraction of time it needs to transmit according to the traffic load and channel conditions of its UEs, and reports this ratio to the centralized controller via S1 signaling. After receiving the report, the centralized controller forms an adjacency graph of all HeNBs, and then determines the subframes or subbands (carrier frequency) that each HeNB is allowed to transmit, and notifies them of their transmission pattern via S1 signaling [7].

Distributed Architecture

In distributed mode, there is no centralized controller, and one certain HeNB constructs a "Jamming Graph", which describes the interference relationship between itself and its neighbors. Some examples and algorithms are given in [8]-[10]. Additionally, utility function [11] is needed for each HeNB to make decision on whether to send resource coordination request to its neighbors and whether to agree the request from its neighbors.

Information, such as active CC labels and neighbor HeNBs' ID, should be exchanged among HeNBs.

REFERENCES

[1] 3GPP TR 36.902 V9.0.0, Evolved Universal Terrestrial Radio Access Network (E-UTRAN); Self-configuring and self-optimizing network (SON) use cases and solutions

[2] 3GPP TS 32.541 V1.0.0, Telecommunication management; Self-Organizing Networks (SON); Self-healing concepts and requirements

[3] 3GPP TR 32.823 V9.0.0, Telecommunication management; Self-Organizing Networks (SON); Study on Self-healing

[4] Sujuan Feng, Eiko Seidel. Self-Organizing Networks (SON) in 3GPP Long Term Evolution.Nomor Research. May, 2008.

[5] 3GPP TR 36.921 V1.0.0, Evolved Universal Terrestrial Radio Access (E-UTRA); FDD Home eNode B (HeNB) Radio Frequency (RF) requirements analysis

[6] 3GPP TR 36.922 V1.0.0, Evolved Universal Terrestrial Radio Access (E-UTRA); TDD Home eNode B (HeNB) Radio Frequency (RF) requirements analysis

[7] R4-100178, "Text proposal on LTE TDD HeNB interference control", CMCC, Qualcomm Incorporated.

[8] R4-091907, "Frequency Reuse Results with Mixed Traffic", Qualcomm Europe.

[9] R4-091906, "Frequency Reuse Results with full buffer traffic", Qualcomm Europe.

[10] R4-092872, "Downlink interference coordination between HeNBs", CMCC.

[11] R4-094851, "Utility Messages for HeNB ICIC", Qualcomm Europe.

SUMMARY OF THE INVENTION

It is an object of the present invention to improve problems of the prior art.

According to a first aspect of the invention, there is provided an apparatus, comprising base station means adapted to provide a base station functionality using component carriers; neighbor detecting means adapted to detect a neighboring base station; informing means adapted to inform a coordinating device about the neighboring base station; willingness setting means adapted to set a willingness to perform self-tuning based on a respective long-term priority for each component carrier usable by the base station means, wherein the long-term priorities are received from the coordinating device, and wherein the willingness is only set if the long-term priorities are not in contradiction to an actual requirement of the base station means, willingness providing means adapted to provide an indication of the willingness to the coordinating device; and self-tuning means adapted to perform self-tuning with respect to the neighboring base station if an agreement statement is received from the coordinating device, wherein, as a result of the self-tuning, a usage of each component carrier by the base station means is based on the received long-term information and the actual requirement.

The apparatus may further comprise diagnosing means adapted to diagnose an interference status of the neighboring base station for one of the component carriers; and the informing means may be further adapted, to inform the coordinating device about the interference status, if the interference status exceeds a first threshold.

In the apparatus, the neighbor detecting means may be adapted to periodically detect the neighboring base station, and the informing means may be adapted to inform the controlling device periodically about the neighboring base station.

In the apparatus, the agreement statement may comprise an indication of base stations with which self-tuning is to be performed, and the self-tuning means may be adapted to perform self-tuning with respect to the indicated base stations.

In the apparatus, the respective long-term priorities of each of the component carriers may have one of the values high, medium, and low, the apparatus may further comprise priority setting means adapted to set respective short-term priorities of each of the component carriers according to a predefined short-term rule, and the long-term information may be in contradiction to the actual requirement if the relationship between the long-term priority and the short-term priority of a component carrier fulfills a predetermined contradiction rule.

In the apparatus, the predefined short-term rule may be such that the priority setting means is adapted to set the respective short-term priorities of each of the component carriers high if an interference for the component carrier is below a lower threshold, medium if the interference is between the lower threshold and an upper threshold, and low if the interference is above the upper threshold.

In the apparatus, the predefined contradiction rule may comprise that for each of the available component carriers at least one of the short-term priority and the long-term priority is low.

In the apparatus, the lower threshold may be equal to the first threshold.

According to a second aspect of the invention, there is provided an apparatus, comprising base station processor adapted to provide a base station functionality using component carriers; neighbor detecting processor adapted to detect a neighboring base station; informing processor adapted to inform a coordinating device about the neighboring base station; willingness setting processor adapted to set a willingness to perform self-tuning based on a respective long-term priority for each component carrier usable by the base station processor, wherein the long-term priorities are received from the coordinating device, and wherein the willingness is only set if the long-term priorities are not in contradiction to an actual requirement of the base station processor, willingness providing processor adapted to provide an indication of the willingness to the coordinating device; and self-tuning processor adapted to perform self-tuning with respect to the neighboring base station if an agreement statement is received from the coordinating device, wherein, as a result of the self-tuning, a usage of each component carrier by the base station processor is based on the received long-term information and the actual requirement.

The apparatus may further comprise diagnosing processor adapted to diagnose an interference status of the neighboring base station for one of the component carriers; and the informing processor may be further adapted, to inform the coordinating device about the interference status, if the interference status exceeds a first threshold.

In the apparatus, the neighbor detecting processor may be adapted to periodically detect the neighboring base station, and the informing processor may be adapted to inform the controlling device periodically about the neighboring base station.

In the apparatus, the agreement statement may comprise an indication of base stations with which self-tuning is to be performed, and the self-tuning processor may be adapted to perform self-tuning with respect to the indicated base stations.

In the apparatus, the respective long-term priorities of each of the component carriers may have one of the values high, medium, and low, the apparatus may further comprise priority setting processor adapted to set respective short-term priorities of each of the component carriers according to a predefined short-term rule, and the long-term information may be in contradiction to the actual requirement if the relationship between the long-term priority and the short-term priority of a component carrier fulfills a predetermined contradiction rule.

In the apparatus, the predefined short-term rule may be such that the priority setting processor is adapted to set the respective short-term priorities of each of the component carriers high if an interference for the component carrier is below a lower threshold, medium if the interference is between the lower threshold and an upper threshold, and low if the interference is above the upper threshold.

In the apparatus, the predefined contradiction rule may comprise that for each of the available component carriers at least one of the short-term priority and the long-term priority is low.

In the apparatus, the lower threshold may be equal to the first threshold.

According to a third aspect of the invention, there is provided a base station comprising an apparatus according to any of the first and second aspects.

According to a fourth aspect of the invention, there is provided an apparatus, comprising neighbor determining means adapted to determine mutual neighbor relationships for each of plural base station devices based on a neighbor information received from each of the plural base station devices; priority determining means adapted to determine a respective long-term priority for each combination of a component carrier and a base station device by which the component carrier is usable, wherein the combinations are formed at least from those of the plural base station devices from which an interference information is received, and the long-term priority may be determined based on the mutual neighbor relationships for each of the plural base station devices and the received interference information; priority providing means adapted to provide the respective determined long-term priorities to at least those of the plural base station devices from which the interference information was received; and agreement providing means adapted to provide an agreement statement to each of the plural base station devices from which the interference information was received if an indication of willingness is received from each of these base station devices.

In the apparatus, the priority determining means and the priority providing means may be adapted to repeat the determining and providing of the long-term priorities until an indication of willingness is received from each of the plural base station devices from which the interference information was received or until a predefined number of repetitions is reached.

In the apparatus, the plural base station devices may be grouped into a first group; further base station devices different from the plural base station devices may be grouped into a second group; the neighbor determining means may be adapted to determine mutual neighbor relationships for each base station device of the first and second groups based on a neighbor information received from each base station device of the first and second groups; the priority determining means may be adapted to determine a respective long-term priority for each combination of a component carrier and a base station device by which the component carrier is usable, wherein the combinations may be formed at least from those of the plural base station devices of the second group from which an interference information is received, and the long-term priority may be determined based on the mutual neighbor relationships for each of the base station devices of the first group and the second group and the received interference information; the priority providing means may be further adapted to provide the respective determined long-term priorities at least to each of the base station devices of the second group from which the interference information was received; and the agreement providing means may be further adapted to provide an agreement statement to at least each of the base station devices of the second group from which the interference information was received if an indication of willingness is received from each of these base station.

In the apparatus, the agreement statement provided to the base station devices of the first group may comprise an identification of the base station devices of the first group, and the agreement statement provided to the base station devices of the second group may comprise an identification of the base station devices of the second group.

In the apparatus, the priority determining means may be adapted to determine the long-term priority of one of the component carriers available to one of the plural base station devices according to a predefined long-term rule.

In the apparatus, the long-term rule may be such that the long-term priority of one of the component carriers available to one of the plural base station devices is set as high if an expected interference for the component carrier of the base station is below a lower threshold, the long-term priority is set as medium if the expected interference is between the lower threshold and an upper threshold, and the long-term priority is set as low if the expected interference is above the upper threshold.

According to a fifth aspect of the invention, there is provided an apparatus, comprising neighbor determining processor adapted to determine mutual neighbor relationships for each of plural base station devices based on a neighbor information received from each of the plural base station devices; priority determining processor adapted to determine a respective long-term priority for each combination of a component carrier and a base station device by which the component carrier is usable, wherein the combinations are formed at least from those of the plural base station devices from which an interference information is received, and the long-term priority may be determined based on the mutual neighbor relationships for each of the plural base station devices and the received interference information; priority providing processor adapted to provide the respective determined long-term priorities to at least those of the plural base station devices from which the interference information was received; and agreement providing processor adapted to provide an agreement statement to each of the plural base station devices from which the interference information was received if an indication of willingness is received from each of these base station devices.

In the apparatus, the priority determining processor and the priority providing processor may be adapted to repeat the determining and providing of the long-term priorities until an indication of willingness is received from each of the plural base station devices from which the interference information was received or until a predefined number of repetitions is reached.

In the apparatus, the plural base station devices may be grouped into a first group; further base station devices different from the plural base station devices may be grouped into a second group; the neighbor determining processor may be adapted to determine mutual neighbor relationships for each base station device of the first and second groups based on a neighbor information received from each base station device of the first and second groups; the priority determining processor may be adapted to determine a respective long-term priority for each combination of a component carrier and a base station device by which the component carrier is usable, wherein the combinations may be formed at least from those of the plural base station devices of the second group from which an interference information is received, and the long-term priority may be determined based on the mutual neighbor relationships for each of the base station devices of the first group and the second group and the received interference information; the priority providing processor may be further adapted to provide the respective determined long-term priorities at least to each of the base station devices of the second group from which the interference information was received; and the agreement providing processor may be further adapted to provide an agreement statement to at least each of the base station devices of the second group from which the interference information was received if an indication of willingness is received from each of these base station.

In the apparatus, the agreement statement provided to the base station devices of the first group may comprise an identification of the base station devices of the first group, and the agreement statement provided to the base station devices of the second group may comprise an identification of the base station devices of the second group.

In the apparatus, the priority determining processor may be adapted to determine the long-term priority of one of the component carriers available to one of the plural base station devices according to a predefined long-term rule.

In the apparatus, the long-term rule may be such that the long-term priority of one of the component carriers available to one of the plural base station devices is set as high if an expected interference for the component carrier of the base station is below a lower threshold, the long-term priority is set as medium if the expected interference is between the lower threshold and an upper threshold, and the long-term priority is set as low if the expected interference is above the upper threshold.

According to a sixth aspect of the invention, there is provided a gateway comprising an apparatus according to any of the fourth and fifth aspects.

According to a seventh aspect of the invention, there is provided a system, comprising a coordinating apparatus according to the fourth aspect; plural base station apparatuses according to the first aspect including at least one base station apparatus comprising the diagnosing means and the informing means; wherein the coordination apparatus comprises the coordination device of all of the plural base stations; each of the plural base station apparatuses comprises a respective base station device of the coordination apparatus; the respective neighbor information received by the coordinating apparatus comprises the information about neighboring base stations provided by the respective base station apparatus; the respective interference information received by the coordinating apparatus comprises the interference statuses provided by the respective base station apparatus comprising the diagnosing means and the informing means; the long-term priorities received by each of the plural base stations comprise the respective long-term priorities provided by the coordinating apparatus; the respective indication of willingness received by the coordinating apparatus comprises the indication of the willingness provided by the respective base station apparatus; and the agreement statement received by each of the plural base station apparatuses comprises the agreement statement provided by the coordinating means.

According to an eighth aspect of the invention, there is provided a system, comprising a coordinating apparatus according to the fifth aspect; plural base station apparatuses according to the second aspect including at least one base station apparatus comprising the diagnosing processor and the informing processor; wherein the coordination apparatus comprises the coordination device of all of the plural base stations; each of the plural base station apparatuses comprises a respective base station device of the coordination apparatus; the respective neighbor information received by the coordinating apparatus comprises the information about neighboring base stations provided by the respective base station apparatus; the respective interference information received by the coordinating apparatus comprises the interference statuses provided by the respective base station apparatus comprising the diagnosing processor and the informing processor; the long-term priorities received by each of the plural base stations comprise the respective long-term priorities provided by the coordinating apparatus; the respective indication of willingness received by the coordinating apparatus comprises the indication of the willingness provided by the respective base station apparatus; and the agreement statement received by each of the plural base station apparatuses comprises the agreement statement provided by the coordinating apparatus.

According to a ninth aspect of the invention, there is provided a method, comprising providing a base station functionality using component carriers; detecting a neighboring base station; informing a coordinating device about the neighboring base station; setting a willingness to perform self-tuning based on a respective long-term priority for each usable component carrier, wherein the long-term priorities are received from the coordinating device, and wherein the willingness is only set if the long-term priorities are not in contradiction to an actual requirement for providing the base station functionality, providing an indication of the willingness to the coordinating device; and performing self-tuning with respect to the neighboring base station if an agreement statement is received from the coordinating device, wherein, as a result of the self-tuning, a usage of each component carrier is based on the received long-term information and the actual requirement.

The method may be a method of self-tuning.

The method may further comprise diagnosing an interference status of the neighboring base station for one of the component carriers; and informing the coordinating device about the interference status, if the interference status exceeds a first threshold.

The method may further comprise periodically detecting the neighboring base station, and the controlling device may be periodically informed about the neighboring base station.

In the method, the agreement statement may comprise an indication of base stations with which self-tuning is to be performed, and the self-tuning may be performed with respect to the indicated base stations.

In the method, the respective long-term priorities of each of the component carriers may have one of the values high, medium, and low, the method may further comprise setting respective short-term priorities of each of the component carriers according to a predefined short-term rule, and the long-term information may be in contradiction to the actual requirement if the relationship between the long-term priority and the short-term priority of a component carrier fulfills a predetermined contradiction rule.

In the method, the predefined short-term rule may be such that the respective short-term priorities of each of the component carriers are set high if an interference for the component carrier is below a lower threshold, medium if the interference is between the lower threshold and an upper threshold, and low if the interference is above the upper threshold.

In the method, the predefined contradiction rule may comprise that for each of the available component carriers at least one of the short-term priority and the long-term priority is low.

In the method, the lower threshold may be equal to the first threshold.

According to a tenth aspect of the invention, there is provided a method, comprising determining mutual neighbor relationships for each of plural base station devices based on a neighbor information received from each of the plural base station devices; determining a respective long-term priority for each combination of a component carrier and a base station device by which the component carrier is usable, wherein the combinations are formed at least from those of the plural base station devices from which an interference information is received, and the long-term priority may be determined based on the mutual neighbor relationships for each of the plural base station devices and the received interference information; providing the respective determined long-term priorities to at least those of the plural base station devices from which the interference information was received; and providing an agreement statement to each of the plural base station devices from which the interference information was received if an indication of willingness is received from each of these base station devices.

The method may be a method of coordinating self-tuning.

In the method, the determining and providing of the long-term priorities may be repeated until an indication of willingness is received from each of the plural base station devices from which the interference information was received or until a predefined number of repetitions is reached.

In the method, the plural base station devices may be grouped into a first group; further base station devices different from the plural base station devices may be grouped into a second group; the method may further comprise determining mutual neighbor relationships for each base station device of the first and second groups based on a neighbor information received from each base station device of the first and second groups; determining a respective long-term priority for each combination of a component carrier and a base station device by which the component carrier is usable, wherein the combinations are formed at least from those of the plural base station devices of the second group from which an interference information is received, and the long-term priority may be determined based on the mutual neighbor relationships for each of the base station devices of the first group and the second group and the received interference information; providing the respective determined long-term priorities at least to each of the base station devices of the second group from which the interference information was received; and providing an agreement statement to at least each of the base station devices of the second group from which the interference information was received if an indication of willingness is received from each of these base station.

In the method, the agreement statement provided to the base station devices of the first group may comprise an identification of the base station devices of the first group, and the agreement statement provided to the base station devices of the second group may comprise an identification of the base station devices of the second group.

In the method, the long-term priority of one of the component carriers available to one of the plural base station devices may be determined according to a predefined long-term rule.

In the method, the long-term priority of one of the component carriers available to one of the plural base station devices may be determined as high if an expected interference for the component carrier of the base station is below a lower threshold, the long-term priority may be determined as medium if the expected interference is between the lower threshold and an upper threshold, and the long-term priority may be determined as low if the expected interference is above the upper threshold.

According to an eleventh aspect of the invention, there is provided a computer program product including a program comprising software code portions being arranged, when run on a processor of an apparatus, to perform the method according to any one of ninth and tenth aspects.

In the computer program product, the computer program product may comprise a computer-readable medium on which the software code portions are stored, and/or wherein the program may be directly loadable into a memory of the processor.

According to embodiments of the invention, at least one of the following advantages is achieved:
1) Spectrum jamming in dynamic network is mitigated;
2) Information of both the whole network and local HeNB surroundings is taken into consideration;
3) The complexity of implementation is low;
4) Only light/medium signalling exchange is required.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In a centralized architecture as described above, one drawback is inevitable. As the controller connects hundreds of HeNBs and it manages the resource (spectrum, time) of the network, the signaling load will be large, and perhaps it even might be impossible to implement.

On the other hand, in a distributed architecture each HeNB is unable to take the status of the whole network into consideration, and the actions of the HeNBs will influence their neighbors, so the whole network may be unstable.

Each of the two network architectures, centralized and distributed, has some drawbacks as mentioned above. According to embodiments of the invention, a third network architecture, semi-distributed, is employed and used in the self-tuning scheme.

Semi-distributed network architecture is different from centralized and distributed ones. In semi-distributed framework, one coordinator is needed to collect information, HeNBs receive information from the coordinator, but each HeNB will make a decision on usage of a CC itself, whereas in centralized mode, all HeNBs are controlled by a controller.

For utilizing the spectrum more flexibly and adapting variation of network, two level hierarchical spectrum sharing schemes, "long-term" and "short-term", have been proposed in network architecture.

Long-term scheme deals with the problem in the view of large time scale (several hours or days, etc), while small time scale (several minutes) is considered in short-term scheme. According to embodiments of the invention, long-term and short-term scheme are also utilized in HeNB network self-tuning.

Long-term information may be understood as the statistical result (several days, weeks or even months) of network, that is, it discloses a stable relationship among HeNBs. Short-term information comprises the measurement results (interference, etc) in small time scale, which delivers the performance experience of home users at the present time. In previous proposals and paper, short-term information has been widely used in interference mitigation; however, long-term information is neglected in many solutions for interference management and SON.

With the increasing number of HeNB in the network, spectrum jamming will occur among HeNBs, which may be designated as "ill" ("healthy" is used for the opposite state). While several HeNBs in network are ill, a method for self-tuning, such as CC reselection, among these HeNBs is an available choice to heal them. However, the actions of these ill HeNBs will influence some of their neighboring healthy ones. Taking these healthy HeNBs out of consideration may cause new spectrum jam, and it may make the whole network unstable. So information about the jamming graph of the whole network is very useful and important. According to embodiments of the invention, this information is taken into consideration as "long-term information". It supports ill HeNBs to have an appropriate decision to heal them without producing new spetrum jamming.

According to some exemplary embodiments of the invention, the following method may be performed:

1) HeNB makes self-diagnosis and reports the corresponding DIAGNOSIS RESULT to a coordinator (such as HeNB gateway (GW), home eNodeB management system (HeMS), MME, server etc.). This may be done periodically or based on an event based trigger for self-tuning. DIAGNOSIS RESULT may comprise interference notification, labels of alternative CCs and primary aggressors' ID (HeNB ID). There may be three cases for HeNB's interference status: low interference, interference tolerable and interference intolerable. The latter two (interference tolerable and interference intolerable) may be reported as interference notification. More in detail, two thresholds of signal to interference plus noise ratio (SINR) may be set to get interference notification (SINR$_{intolerable}$ and SINR$_{tolerable}$/which are set according to a required quality of service (QoS):
    a. If interference exists with a certain degree but QoS can still be satisfied (i.e., SINR$_{intolerable}$<SINR<SINR$_{tolerable}$), interference notification is interference tolerable;
    b. If interference is so serious that QoS cannot be satisfied (i.e., SINR<SINR$_{intolerable}$), interference notification is interference intolerable;

2) After receiving DIAGNOSIS RESULT, coordinator takes both DIAGNOSIS RESULT and HeNB relationship table (constructed by coordinator after receiving neighbor list from each HeNB; a neighbor list may comprise identifications of one or more neighboring HeNBs) into consideration, and then determines priority level and power level of each available CCs for each HeNB (LONG-TERM INFORMATION). Then, coordinator sends LONG-TERM INFORMATION to HeNBs to assist HeNBs in self-tuning. If one HeNB doesn't send DIAGNOSIS RESULT, it might nevertheless be included in self-tuning, and coordinator may send LONG-TERM INFORMATION to this HeNB, too;

3) After receiving LONG-TERM INFORMATION, HeNB jointly considers LONG-TERM INFORMATION and SHORT-TERM INFORMATION (determined by the HeNB, such as cell quality indicator (CQI), etc.) to determine whether to agree to start self-tuning. If HeNB agrees to start self-tuning, it will send SELF-TUNING WILLINGNESS to coordinator. If HeNB doesn't agree, it will reply coordinator a new priority level and power level of each available CCs (REPLY);

4) Self-tuning group by group. In some embodiments, the coordinator may group all HeNBs into groups by using some information, such as primary aggressor's ID (HeNB ID) received from each HeNB or into predefined groups. In some embodiments, all HeNBs reporting to the coordinator may form one group, Coordinator sends SELF-TUNING AGREEMENT to HeNBs in one group when it receives SELF-TUNING WILLINGNESS from all HeNBs in the same group. If coordinator receives REPLY from one or more than one HeNBs in one group, it will send SELF-TUNING CANCELLING. And then, according to the REPLY receiving from HeNBs, coordinator updates LONG-TERM INFORMATION. Then coordinator sends LONG-TERM INFORMATION to HeNBs to start another round of self-tuning;

5) After receiving SELF-TUNING AGREEMENT from coordinator, each HeNB implements self-tuning and sends SELF-TUNING FEEDBACK to coordinator. If HeNB receives SELF-TUNING CANCELLING, it will wait for next LONG-TERM INFORMATION.

Figure 4:
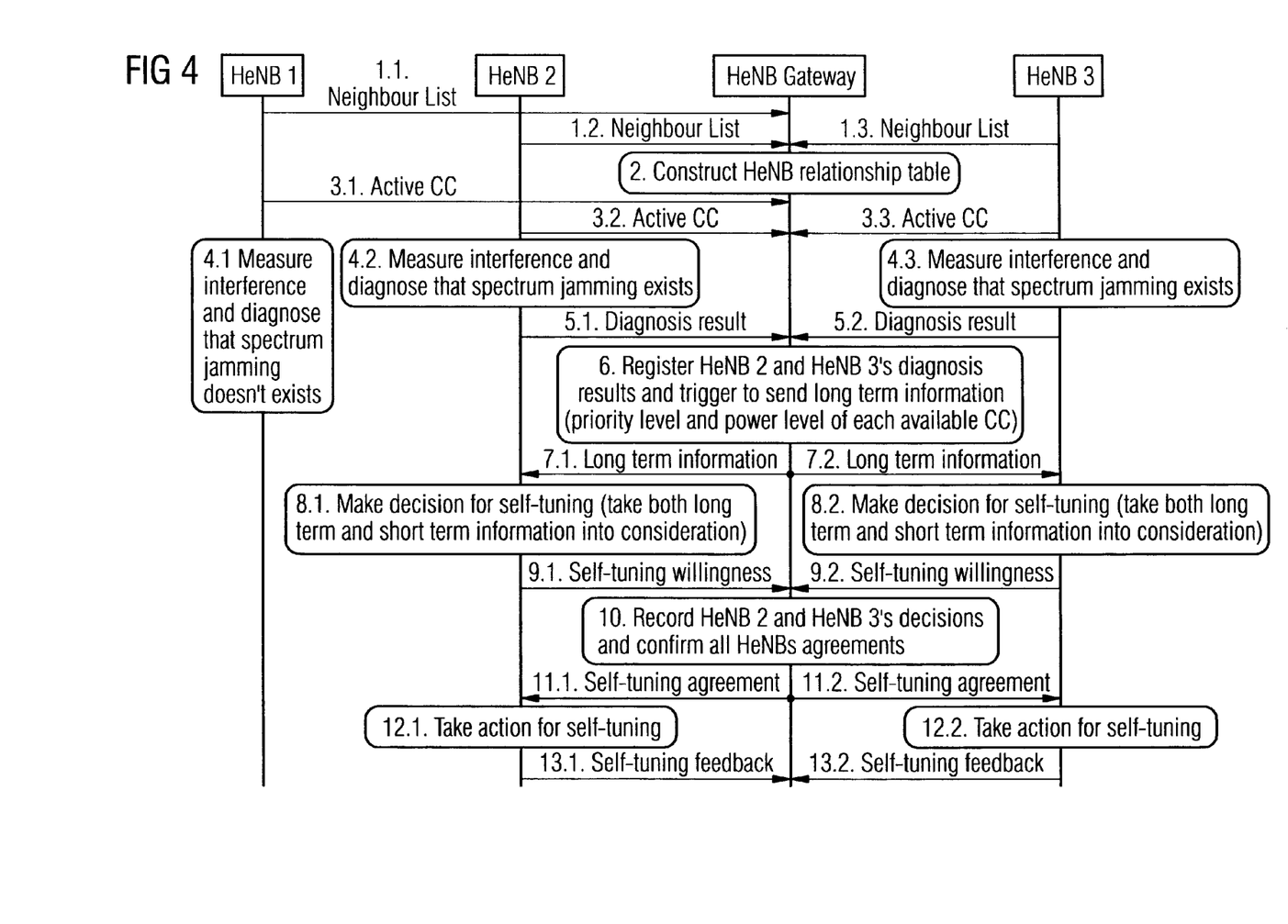
FIG. 4 shows a method according to an embodiment of the invention.

More in detail, a method according to an embodiment of the present invention will be described in the following, based on FIG. 4, wherein the network scenario of FIG. 1 is exemplarily considered. FIG. 4 shows a message flow between the coordinator and the HeNBs 1 to 3. According to FIG. 4, the HeNB gateway takes the role of the coordinator.

1) "Neighbor List", which includes neighbors' ID, is transmitted repeatedly with long period, such as once an hour. One threshold (PL$_{neighbor}$) should be defined. If one HeNB's pathloss to the HeNB, PL, is smaller than the threshold, i.e. PL<PL$_{neighbor}$, the HeNB's ID will be written in neighbor list. Tab. 1 gives HeNB 1, HeNB 2 and HeNB 3's neighbor list.

TABLE 1

| HeNB 1, HeNB 2 and HeNB 3's neighbor list | | |
|---|---|---|
| HeNB ID | Neighbor | List |
| HeNB 1 | HeNB 3 | — |
| HeNB 2 | HeNB 3 | — |
| HeNB 3 | HeNB 1 | HeNB 2 |

2) Preferably HeNB gateway (GW) may have a statistical result on HeNBs' neighboring relationship (in large time scale) by receiving each HeNB's neighbor list periodically. Then, HeNB relationship table may be as shown in Tab. 2. In some embodiments, or if no statistical result is available, the instantaneous "neighbor list" reports may serve as a base for the relationship table.

TABLE 2

HeNB relationship table

|        | HeNB 1 | HeNB 2 | HeNB 3 |
|--------|--------|--------|--------|
| HeNB 1 | —      | No     | Yes    |
| HeNB 2 | No     | —      | Yes    |
| HeNB 3 | Yes    | Yes    | —      |

Figure 5:
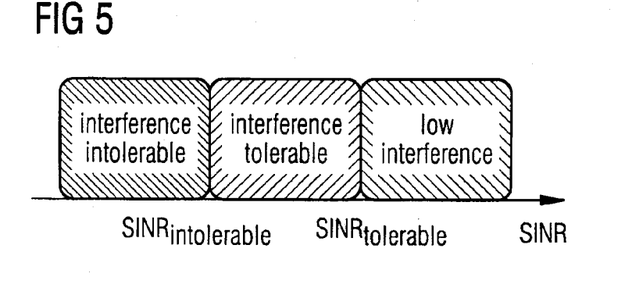
FIG. 5 shows SINR thresholds and corresponding diagnosis results according to an embodiment of the invention.

3) The HeNBs send their active CC's labels to the GW. (In practice, GW may register active CC's label of these HeNBs all the time. For the completeness of self-tuning's procedure, e.g., if another entity than the GW takes the role of the coordinator, this signaling step is included in the description of the method.)
4) The HeNBs measure interference surrounding and give diagnose result to the GW. Diagnosis result describes the level of spectrum jamming. Here, two SINR thresholds ($SINR_{intolerable}$ and $SINR_{tolerable}$) and three statuses (low interference, interference tolerable and interference intolerable) are used for diagnosis. FIG. 5 gives the relationship between SINR thresholds and interference status. Tab. 3 gives the detailed meaning of diagnosis result.

TABLE 3

Description of diagnosis result

| Diagnosis Result | Meaning of diagnosis | Need to send the diagnosis result to GW |
|---|---|---|
| low interference | Interference power is trivial | No |
| interference tolerable | Spectrum jamming exists, but QoS of service can still be satisfied | Yes |
| interference intolerable | Spectrum jamming is serious, QoS of service can NOT be satisfied | Yes |

5) Both HeNB 3 and HeNB 2's diagnosis results are interference tolerable, so they send diagnose result to GW.
6) GW registers HeNB 3 and HeNB 2's diagnosis results. For
   a. HeNB 2 and HeNB 3 are neighbor;
   b. both of them have spectrum jamming problem.
   GW sends long-term information to HeNB 2 and HeNB 3 for self-tuning. Long-term information is the priority level and power level of each available CC, which can be denoted as low, middle, high. It contains GW's suggestion from the view of the whole network's spectrum allocation. GW determines the priority level of each available CC for each HeNB following one rule, neighboring HeNBs use different CC.

TABLE 4

Long-term information in GW

|       | CC1 | CC2 |
|-------|-----|-----|
| HeNB1 | ✓   | X   |
| HeNB2 | ✓   | X   |

TABLE 4-continued

Long-term information in GW

|       | CC1 | CC2 |
|-------|-----|-----|
| HeNB3 | X   | ✓   |

Remark:
High ✓
Middle —
Low X

7) GW sends long-term information to HeNB 2 and HeNB 3. Although HeNB 1 didn't send diagnosis result to HeNB gateway, it may also be included in self-tuning. If HeNB 1 is included in self-tuning, HeNB gateway sends long-term information to HeNB 1, too.
8) After receiving long-term information from GW, HeNB 2 and HeNB 3 make decision for self-tuning by themselves. As the long-term information lacks interference information in small time scale, short-term information is also very important for HeNBs. Here, short-term information can also be defined as priority level and power level for each available CC, and it is evaluated from the present surrounding interference, including the interference from eNB, MUE, and relay, etc (excluding interference from its neighboring HeNBs). The SINR on CC1 and CC2 can be measured by HeNB or by its home user (HUE), $SINR_{CC1}$ and $SINR_{CC2}$.
   a. $SINR_{CC1} > SINR_{CC2}$, CC1 is high, CC2 is low;
   b. $SINR_{CC1} < SINR_{CC2}$, CC1 is low, CC2 is high.
   Having the short-term (Tab. 5) and long-term information, according to a predefined rule, each HeNB gets priority level for each available CC. For example, according to the rule outlined in Tab. 6, the priority level is low if one of the short-term and long-term priority levels is low, it is medium, if both short-term and long-term priority levels are medium, and is otherwise high. Each HeNBs' rule may be different.
   Finally, if HeNB's decision for each available is NOT contradictive with GW's, it will send signaling for agreement on self-tuning to GW.

TABLE 5

Short-term information for each HeNE

|       | CC1 | CC2 |
|-------|-----|-----|
| HeNB1 | ✓   | X   |
| HeNB2 | —   | —   |
| HeNB3 | —   | —   |

Remark:
High ✓
Middle —
Low X

TABLE 6

Rule for HeNB's decision for each available CC

|   | Short-term | Long-term | HeNB's decision |
|---|---|---|---|
| 1 | ✓ | ✓ | ✓ |
| 2 | ✓ | — | ✓ |
| 3 | ✓ | X | X |
| 4 | — | ✓ | ✓ |
| 5 | — | — | — |
| 6 | — | X | X |
| 7 | X | ✓ | X |

TABLE 6-continued

Rule for HeNB's decision for each available CC

| | Short-term | Long-term | HeNB's decision |
|---|---|---|---|
| 8 | X | — | X |
| 9 | X | X | X |

Remark:
High ✓
Middle —
Low X

TABLE 7

Short-term information in each HeNB

| | CC1 | | | CC2 | | |
|---|---|---|---|---|---|---|
| | Short-term | Long-term | Priority level | Short-term | Long-term | Priority level |
| HeNB1 | — | ✓ | ✓ | — | X | X |
| HeNB2 | — | ✓ | ✓ | — | X | X |
| HeNB3 | — | X | X | — | ✓ | ✓ |

Remark:
High ✓
Middle —
Low X

9) HeNB sends signaling to GW for agreement on self-tuning.
10) GW records all HeNBs' decisions.
   a. If all HeNBs agree, GW will send signaling to each HeNB that all HeNBs have agreed on self-tuning;
   b. If one HeNB denies, GW will send signaling to each HeNB that some HeNBs denied self-tuning.
11) GW sends signaling to HeNB2 and HeNB3 to tell them that all HeNBs have agreed on self-tuning.
12) After receiving signaling from GW, HeNB2 and HeNB3 take actions for self-tuning independently. HeNB2 abandons CC2 and then chooses CC1 as its active CC. HeNB3 works on CC2 as before.
13) HeNB2 and HeNB3 send self-tuning feedback to tell GW that self-tuning has been finished.

Pros and cons of centralized and distributed architectures are discussed hereinabove. In Tab. 8, they are compared with the semi-distributed architecture according to embodiments of the invention:

TABLE 8

Comparison of centralized, distributed and semi-distributed architectures

| | Know the whole network | One centralized controller or coordinator needed | Signaling exchange | All information of local HeNB taken into consideration |
|---|---|---|---|---|
| Centralized | Yes | Yes | Heavy | No |
| Distributed | No | No | Light | Yes |
| Semi-distributed | Yes | Yes | Middle | Yes |

Figure 6:
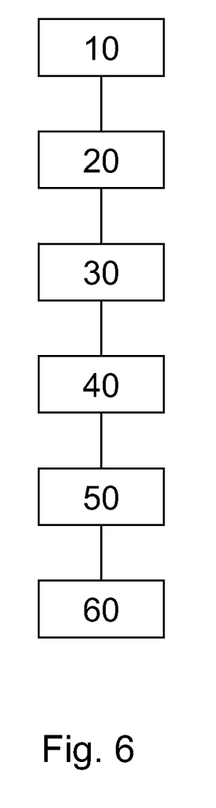
FIG. 6 shows an apparatus according to an embodiment of the invention.
Figure 8:
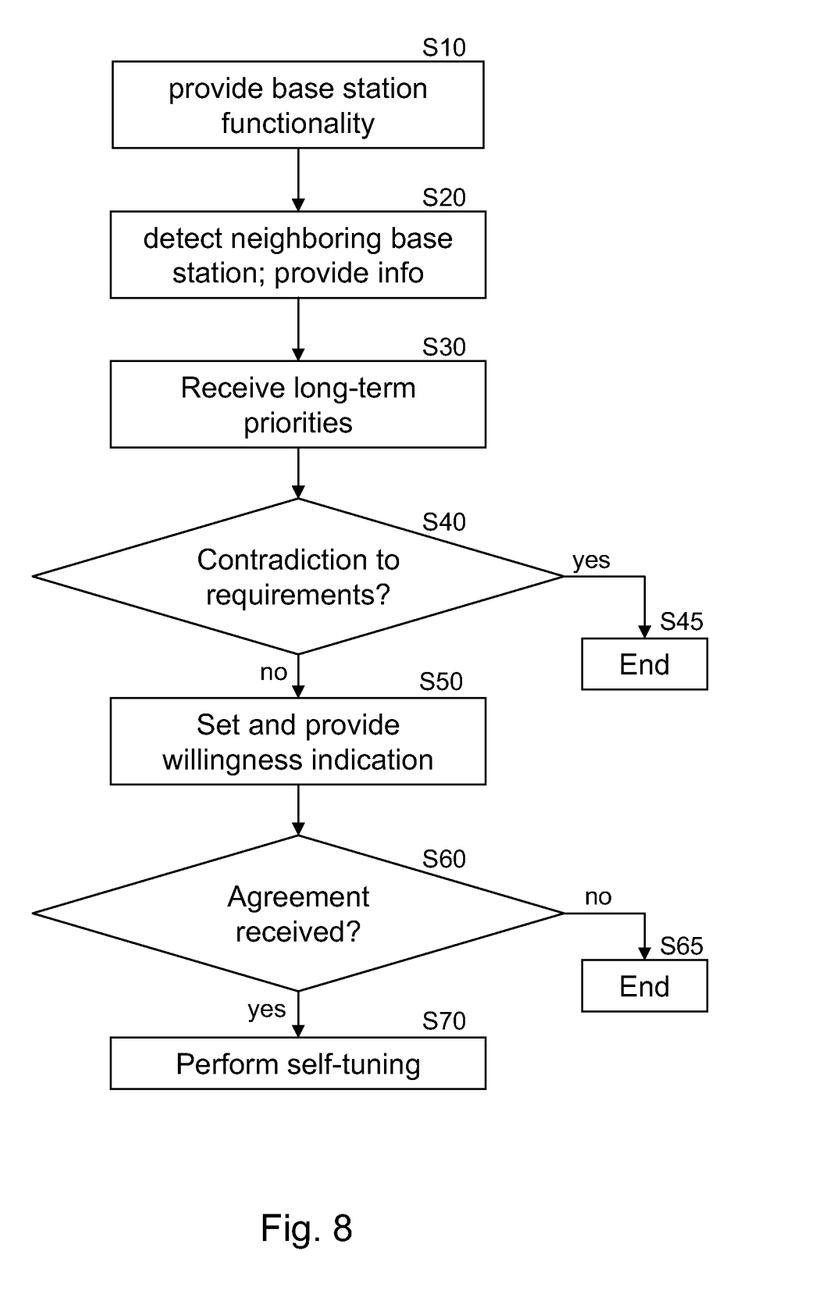
FIG. 8 shows a method according to an embodiment of the invention.

FIG. 6 shows an apparatus according to an embodiment of the invention. The apparatus may be a base station such as a Home eNodeB. FIG. 8 shows a method according to an embodiment of the invention. The apparatus according to FIG. 6 may perform the method of FIG. 8 but is not limited to this method. The method of FIG. 8 may be performed by the apparatus of FIG. 6 but is not limited to being performed by this apparatus.

The apparatus comprises a base station means 10, a neighbor detecting means 20, an informing means 30, a willingness setting means 40, a willingness providing means 50, and a self-tuning means 60.

The base station means 10 is adapted to provide a base station functionality of the mobile network (S10), therein using component carriers.

The neighbor detecting means 20 detects base stations which are neighbored to the apparatus. Here, neighbored means that the distance between the apparatus and the neighbored base station is not too large. This can be determined e.g. based on path loss measurements. The informing means 30 informs a coordinator about the neighbored base stations (S20).

According to step S30, long-term priorities are received from the coordinator.

The willingness setting means 40 first checks, if the received long-term priorities are in conflict with actual requirements (such as QoS, throughput) of the base station means (S40). If they are in conflict, the method ends (S45). Otherwise, the willingness setting means 40 sets a willingness to perform self-tuning (S50). An indication of the willingness is provided to the coordinator by the willingness providing means 50.

According to step S60, it is checked whether an agreement statement is received from the coordinator. If not, the method ends (S65).

Otherwise, the self-tuning means 60 will perform self-tuning (S70). Therein, it takes bath the long-term priorities and the actual requirement of the base station means into account.

Figure 7:
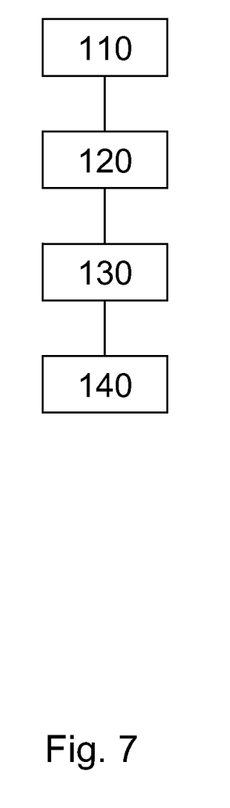
FIG. 7 shows an apparatus according to an embodiment of the invention.
Figure 9:
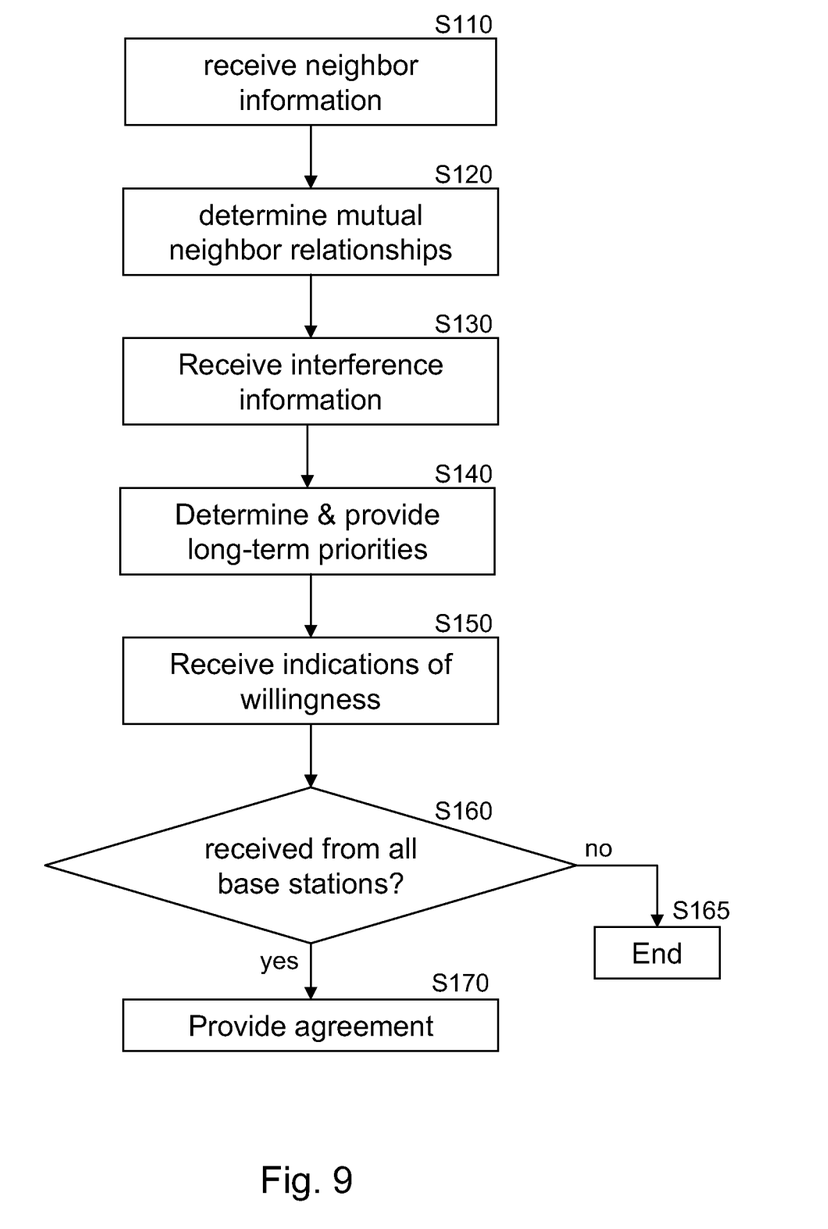
FIG. 9 shows a method according to an embodiment of the invention.

FIG. 7 shows an apparatus according to an embodiment of the invention. The apparatus may be a coordinator such as a HeNB gateway. FIG. 9 shows a method according to an embodiment of the invention. The apparatus according to FIG. 7 may perform the method of FIG. 9 but is not limited to this method. The method of FIG. 9 may be performed by the apparatus of FIG. 7 but is not limited to being performed by this apparatus.

The apparatus comprises a neighbor determining means 110, a priority determining means 120, a priority providing means 130, and an agreement providing means 140.

According to step S110, neighbor information is received from plural base stations.

The neighbor determining means 110 determines mutual neighbor relationships based on the received neighbor information (S120).

According to step S130, interference information is received at least from some of the plural base stations. In some embodiments, the sequence of steps S120 and S130 may be changed.

The priority determining means 120 determines long-term priorities based on the mutual neighbor relationships and the received interference information. The priority providing means 130 provides these long-term priorities at least to the base stations from which interference information was received (S140).

According to step S150, indications of willingness are received from the base stations. Then, it is checked according to step S160, if indications of willingness are received from all base stations to which the long-term priorities were sent. If not, the method ends (S165).

Otherwise, if indications of willingness are received from all base stations to which long-term priorities were provided, the agreement providing means 140 provides an agreement statement to all of these base stations (S170).

Embodiments of the invention are described with respect to a 3GPP Long-term evolution advanced system. However, embodiments of the invention may be employed in other 3GPP releases and other mobile networks such as universal mobile telecommunication system (UMTS), global packet radio system (GPRS); or long term evolution (LTE). Correspondingly, in some embodiments, a method of self-tuning according to the present invention may be employed for HeNodeBs, macro-, micro, and pico-eNodeBs, or corresponding base stations of the respective networks mentioned above, such as a BTS may be employed in certain embodiments. Still correspondingly, in some embodiments, instead of component carriers other radio resources may be employed which might interfere with radio resources of neighboring base stations.

In some embodiments, interference with radio resources of different networks and/or technologies than that of the HeNB and coordinator under consideration may occur and is mitigated according to the above described method.

In some embodiments, the coordinator may be a separate entity, or may be employed in another node (e.g. HeNB gateway, HeNB management system (HeMS), mobility management entity (MME), server) of the network.

In some embodiments, the HeNB decides whether there is interference, whether it is tolerable or not, and sends a corresponding indication to the coordinator. In other embodiments, the measured interference values are sent to the coordinator who decides whether it is tolerable or not.

Furthermore, in some embodiments, the threshold to send a diagnosis result may be different from the two thresholds to decide whether interference is not present, tolerable, or intolerable. For example, the threshold to send a diagnosis result may be 0, i.e., every diagnosis result will be sent to the coordinator.

If not otherwise stated or otherwise made clear from the context, the statement that two entities are different means that they are differently addressed in the mobile network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a base station, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a coordinating entity, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising: one or more processors; and one or more memories including computer program code, the one or more memories and the computer program code configured, with the one or more processors, to cause the apparatus to perform at least the following:
provide a base station functionality using component carriers;
detect a neighboring base station;
inform a coordinating device about an interference status of the neighboring base station;
set a willingness to perform self-tuning by the apparatus based on a respective long-term priority for each component carrier usable by the apparatus, wherein the long-term priorities are received from the coordinating device and used by the apparatus to determine whether or not to set the willingness to perform self-tuning, and wherein the willingness is only set if the long-term priorities for each component carrier usable by the apparatus are not in contradiction to an existing actual requirement for component carriers used by the apparatus,
provide an indication of the willingness to the coordinating device; and
perform self-tuning with respect to the neighboring base station if an agreement statement is received from the coordinating device, wherein, as a result of the self-tuning, a usage of each component carrier by the apparatus is automatically selected taking into account both the received long-term priorities for each component carrier usable by the apparatus and the existing actual requirement of the apparatus.

2. An apparatus according to claim 1, wherein the one or more memories and the computer program code are configured, with the one or more processors, to further cause the apparatus to;
diagnose an interference status of the neighboring base station for one of the component carriers; and wherein
inform the coordinating device about the interference status, if the interference status exceeds a first threshold.

3. An apparatus according to claim 1, wherein the one or more memories and the computer program code are configured, with the one or more processors, to further cause the apparatus to;
periodically detect the neighboring base station, and
inform the coordinating device periodically about the neighboring base station.

4. An apparatus according to claim 1, wherein
the agreement statement comprises an indication of base stations with which self-tuning is to be performed, and wherein the one or more memories and the computer program code are configured, with the one or more processors, to further cause the apparatus to
perform self-tuning with respect to the indicated base stations.

5. An apparatus according to claim 1, wherein
the respective long-term priorities of each of the component carriers have one of the values high, medium, and low, and wherein the one or more memories and the computer program code are configured, with the one or more processors to further cause the apparatus to set respective short-term priorities of each of the component carriers according to a predefined short-term rule, and wherein the long-term information is in contradiction to the actual requirement if the relationship between the long-term priority and the short-term priority of a component carrier fulfills a predetermined contradiction rule.

6. Base station comprising an apparatus according to claim 1.

7. A method, comprising
in a communication device,
providing a base station functionality using component carriers;
detecting a neighboring base station;
informing a coordinating device about an interference status of the neighboring base station;
setting a willingness to perform self-tuning by the communication device based on a respective long-term priority for each usable component carrier, wherein the long-term priorities are received from the coordinating device and used by the communication device to determine whether or not to set the willingness to perform self-tuning, and wherein the willingness is only set if the long-term priorities for each component carrier usable by the by the communication device are not in contradiction to an existing actual requirement for component carriers used by the communication device for providing the base station functionality,
providing an indication of the willingness to the coordinating device; and
performing self-tuning with respect to the neighboring base station if an agreement statement is received from the coordinating device, wherein, as a result of the self-tuning, a usage of each component carrier is automatically selected taking into account both the received long-term priorities and the existing actual requirement of the communication device.

8. A method according to claim 7, further comprising
diagnosing an interference status of the neighboring base station for one of the component carriers; and
informing the coordinating device about the interference status, if the interference status exceeds a first threshold.

9. A method according to claim 7, further comprising
periodically detecting the neighboring base station, and wherein
the coordinating device is periodically informed about the neighboring base station.

10. A method according to claim 7, wherein
the agreement statement comprises an indication of base stations with which self-tuning is to be performed, and
the self-tuning is performed with respect to the indicated base stations.

11. A method according to claim 7, wherein
the respective long-term priorities of each of the component carriers have one of the values high, medium, and low, the method further comprising
respective short-term priorities of each of the component carriers are set according to a predefined short-term rule, and
wherein the long-term information is in contradiction to the actual requirement if the relationship between the long-term priority and the short-term priority of a component carrier fulfills a predetermined contradiction rule.

12. A computer program product comprising a computer readable storage medium having computer-readable code embodied thereon, the computer-readable code executable by an apparatus and causing the apparatus, in response to execution of the computer-readable code, causing the apparatus to perform at least the following:

providing a base station functionality using component carriers;
detecting a neighboring base station;
informing a coordinating device about an interference status of the neighboring base station;
setting a willingness to perform self-tuning by the computer program product based on a respective long-term priority for each usable component carrier, wherein the long-term priorities are received from the coordinating device and used by the computer program product to determine whether or not to set the willingness to perform self-tuning, and wherein the willingness is only set if the long-term priorities for each component carrier usable by the computer program product are not in contradiction to an existing actual requirement for component carriers used by the computer program product for providing the base station functionality,
providing an indication of the willingness to the coordinating device; and
performing self-tuning with respect to the neighboring base station if an agreement statement is received from the coordinating device, wherein, as a result of the self-tuning, a usage of each component carrier is automatically selected taking into account both the received long-term priorities for each component carrier usable by the computer program product and the existing actual requirement of the computer program product.

13. The computer program product of claim 12, causing the apparatus to further perform
diagnosing an interference status of the neighboring base station for one of the component carriers; and
informing the coordinating device about the interference status, if the interference status exceeds a first threshold.

14. The computer program product of claim 12, causing the apparatus to further perform
periodically detecting the neighboring base station, and wherein
the coordinating device is periodically informed about the neighboring base station.

15. The computer program product of claim 12, wherein
the agreement statement comprises an indication of base stations with which self-tuning is to be performed, and
the self-tuning is performed with respect to the indicated base stations.

16. The computer program product of claim 12, wherein
the respective long-term priorities of each of the component carriers have one of the values high, medium, and low, the method further comprising
respective short-term priorities of each of the component carriers are set according to a predefined short-term rule, and
wherein the long-term information is in contradiction to the actual requirement if the relationship between the long-term priority and the short-term priority of a component carrier fulfills a predetermined contradiction rule.

* * * * *